(12) United States Patent
Segawa et al.

(10) Patent No.: US 9,381,941 B2
(45) Date of Patent: Jul. 5, 2016

(54) VEHICLE FRONT BODY STRUCTURE

(71) Applicant: FUJI JUKOGYO KABUSHIKI KAISHA, Tokyo (JP)

(72) Inventors: Takahiro Segawa, Tokyo (JP); Toshihiro Ayabe, Tokyo (JP); Hiromi Tamo, Tokyo (JP); Takatomo Watamori, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 13 days.

(21) Appl. No.: 14/661,333

(22) Filed: Mar. 18, 2015

(65) Prior Publication Data
US 2015/0274208 A1 Oct. 1, 2015

(30) Foreign Application Priority Data

Mar. 31, 2014 (JP) ................................. 2014-071067

(51) Int. Cl.
*B62D 21/15* (2006.01)
*B62D 25/08* (2006.01)

(52) U.S. Cl.
CPC ............ *B62D 21/152* (2013.01); *B62D 25/082* (2013.01); *B62D 25/085* (2013.01)

(58) Field of Classification Search
CPC ... B62D 21/152; B62D 25/082; B62D 25/085
USPC ....................................................... 180/232
See application file for complete search history.

(56) References Cited

U.S. PATENT DOCUMENTS

| | | | | |
|---|---|---|---|---|
| 6,957,846 B2* | 10/2005 | Saeki | ................... | B62D 21/152 180/232 |
| 8,596,711 B2* | 12/2013 | Yasui | ..................... | B60R 19/34 296/187.09 |
| 8,807,597 B2* | 8/2014 | Akaki | ................... | B62D 21/02 180/232 |
| 9,010,845 B1* | 4/2015 | Ramoutar | ............... | B60R 19/14 293/155 |
| 2004/0200659 A1* | 10/2004 | Miyasaka | ............ | B62D 21/155 180/312 |
| 2011/0266785 A1* | 11/2011 | Mildner | ................. | B62D 21/11 280/785 |
| 2012/0248820 A1 | 10/2012 | Yasui et al. | | |
| 2013/0320709 A1* | 12/2013 | Kuwabara | ............ | B62D 25/082 296/187.09 |

(Continued)

FOREIGN PATENT DOCUMENTS

| | | |
|---|---|---|
| JP | 2009-012703 | 1/2009 |
| JP | 2012-214211 | 11/2012 |

*Primary Examiner* — Barry Gooden, Jr.
(74) *Attorney, Agent, or Firm* — Smith, Gambrell & Russell, LLP

(57) ABSTRACT

A reinforcement part formed in an intermediate position of either one of left and right front side frames. The reinforcement part has an enhanced strength against a deformation due to a compressive load in front-and-rear directions and a bending load caused when a tip end of the front side frame is pressed from outside in the vehicle width directions, rather than a strength of an area forward of the reinforcement part. A fragile part is formed in an intermediate position of the other front side frame. The vulnerable part has a reduced strength against a deformation due to a bending load when a tip end of the other front side frame is pressed from inside in the vehicle width directions.

18 Claims, 6 Drawing Sheets

(56) References Cited

U.S. PATENT DOCUMENTS

| | | | | |
|---|---|---|---|---|
| 2013/0320710 | A1* | 12/2013 | Watanabe | B62D 25/082 296/187.09 |
| 2014/0159429 | A1* | 6/2014 | Chung | B62D 25/08 296/193.09 |
| 2014/0291053 | A1* | 10/2014 | Nagasawa | B62D 21/152 180/271 |
| 2014/0375081 | A1* | 12/2014 | Kuriyama | B62D 25/16 296/187.1 |
| 2015/0021936 | A1* | 1/2015 | Nusier | B62D 21/152 293/114 |
| 2015/0035316 | A1* | 2/2015 | Kuriyama | B62D 21/152 296/187.1 |
| 2015/0054312 | A1* | 2/2015 | Hisazumi | B62D 25/082 296/193.09 |
| 2015/0076862 | A1* | 3/2015 | Abe | B62D 21/152 296/187.1 |
| 2015/0102636 | A1* | 4/2015 | Cho | B62D 25/082 296/187.09 |
| 2015/0115664 | A1* | 4/2015 | Mildner | B62D 25/082 296/203.02 |
| 2015/0251702 | A1* | 9/2015 | Volz | B62D 21/152 296/187.1 |
| 2015/0283901 | A1* | 10/2015 | Bernardi | B60K 5/1275 180/232 |

* cited by examiner

VEHICLE FRONT BODY STRUCTURE

CROSS-REFERENCE TO RELATED APPLICATION

The present application claims priority from Japanese Patent Application No. 2014-071067 filed on. Mar. 31, 2014, the entire contents of which are hereby incorporated by reference.

BACKGROUND

1. Technical Field

The present disclosure relates to a vehicle front body structure for vehicles, such as automobiles, and particularly to the vehicle front body structure that reduces damages to a power unit when an obstacle collides diagonally from front.

2. Related Art

Typical vehicle front body structures of automobiles have a pair of left and right front side frames projected forward in the vehicle from a toe board that is a bulkhead of a cabin front part. The left and right front side frames serves as a base to which sub-frames and cross members to which, for example, front suspensions are attached, and to which, for example, various exterior parts are attached. An engine room is formed in a gap between the left and right front side frames, and a power unit including an engine and a transmission are mounted therein.

For such a vehicle front body structure, an improvement of anti-collision performance is demanded by controlling various deformation at the time of a collision. For example, Japanese Unexamined Patent Application Publication (JP-A) No. 2012-214211 discloses a control of a deformation mode of a vehicle body by using branch frames that are branched outwardly in vehicle width directions from the respective front side frames, and fragile parts provided rearward of the respective branch frames, etc., in order to improve a performance against a front collision outside either one of the front side frames (a narrow offset collision), Further, JP-A No. 2009-012703 discloses a stiffener, of which a front end edge having a step is disposed so as to bridge over an assumed break line in front-and-rear directions, is lap-welded to each front side frame, in order to control a break mode of the front side frames at the time of an offset collision.

These days, it becomes problematic that, when an obstacle collides diagonally from front of a vehicle, strong parts such as bumper beams and tie-down hooks are pushed relatively rearward into a vehicle body main part due to axial collapse of the front side frames, resulting in damages to a power unit such as an engine. The vehicle front body structure is required that does not cause serious damages to the power unit even at the time of such a diagonal collision.

SUMMARY OF THE INVENTION

The present disclosure is made in view of the above situations, and a purpose of the present disclosure is to provide a vehicle front body structure that reduces damages to a power unit when an obstacle collides diagonally from front.

According to one aspect of the present disclosure, a vehicle front body structure is provided, which includes left and right front side frames in pair that are formed so as to project forward in a vehicle from a front part of a vehicle cabin, and are disposed so as to be separated from each other in vehicle width directions, a coupling member that couples front end parts of the left and right front side frames, and a power unit disposed in an area that is located between the left and right front side frames and rearward of the coupling member. A reinforcement part is formed in an intermediate position of either one of the left and right front side frames. The reinforcement part has an enhanced strength against a deformation due to a compressive load in front-and-rear directions and a bending load caused when a tip end of the either one of the front side frames is pressed from outside in the vehicle width directions, rather than a strength of an area forward of the reinforcement part. A fragile part is formed in an intermediate position of the other front side frame. The fragile part has a reduced strength against a deformation due to a bending load when a tip end of the other front side frame is pressed from inside in the vehicle width directions.

The fragile part may be disposed rearward in the vehicle from the reinforcement part.

The coupling member may be a bumper beam provided so as to bridge between the tip ends of the left and right front side frames. A load transmitting member may be provided in an area of the bumper beam outward in the vehicle width directions from the front side frame so as to project rearward in the vehicle from the bumper beam. The load transmitting member may press a side face part of the front side frame when the vehicle collides an obstacle diagonally from front and the bumper beam is bent and deformed.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

The present disclosure solves the issue to provide a vehicle front body structure that reduces damages to a power unit when an obstacle collides a vehicle diagonally from front, by forming a reinforcement part in an intermediate position of one of front side frames, and forming a fragile part in an intermediate position of the other front side frame, rearward of the reinforcement part in the vehicle.

Example

Figure 1:
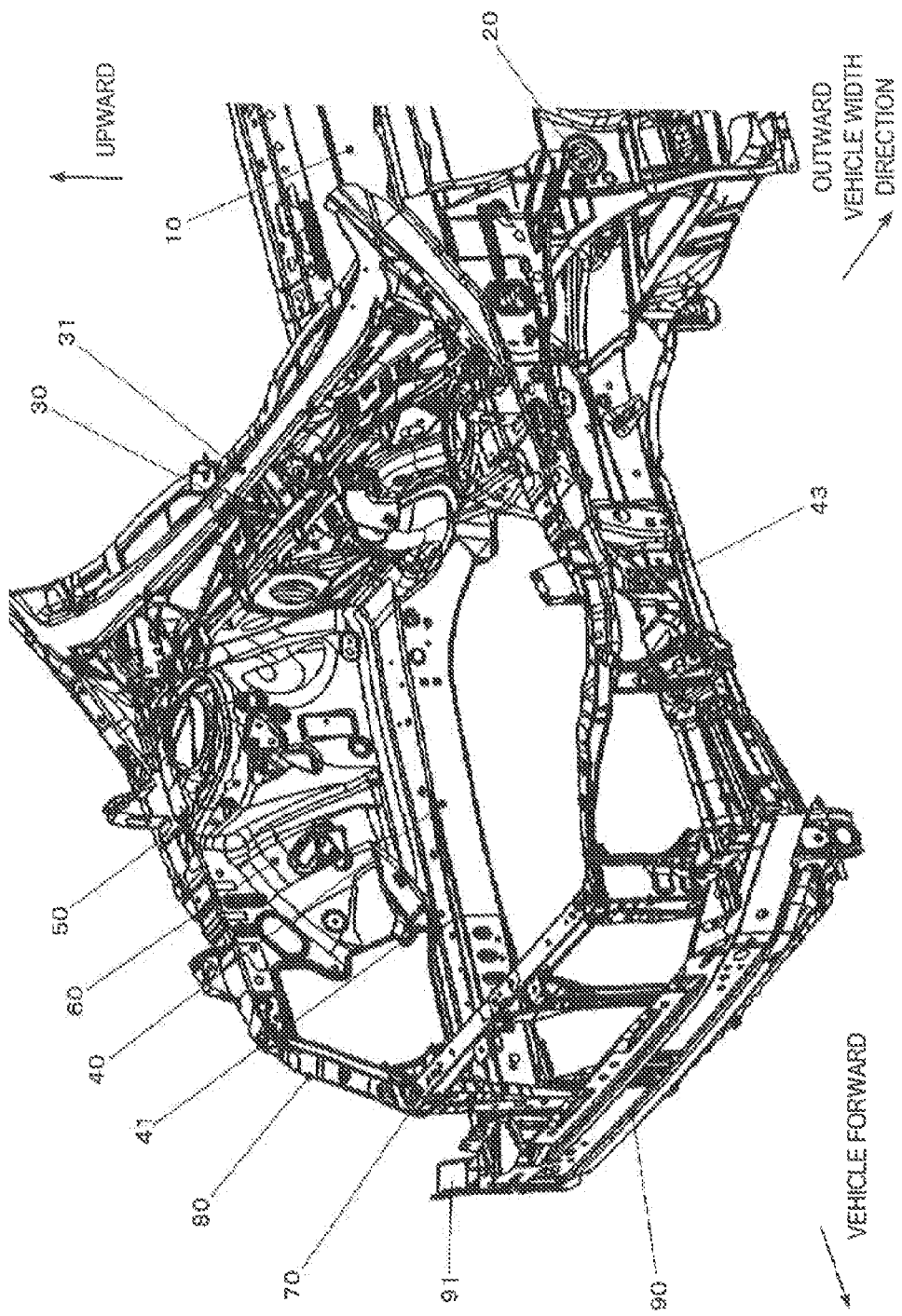
FIG. 1 is an outline perspective view illustrating a white body (non-rigged body) having one example of a vehicle front body structure to which the present disclosure is applied, viewed diagonally from front left.
Figure 2:
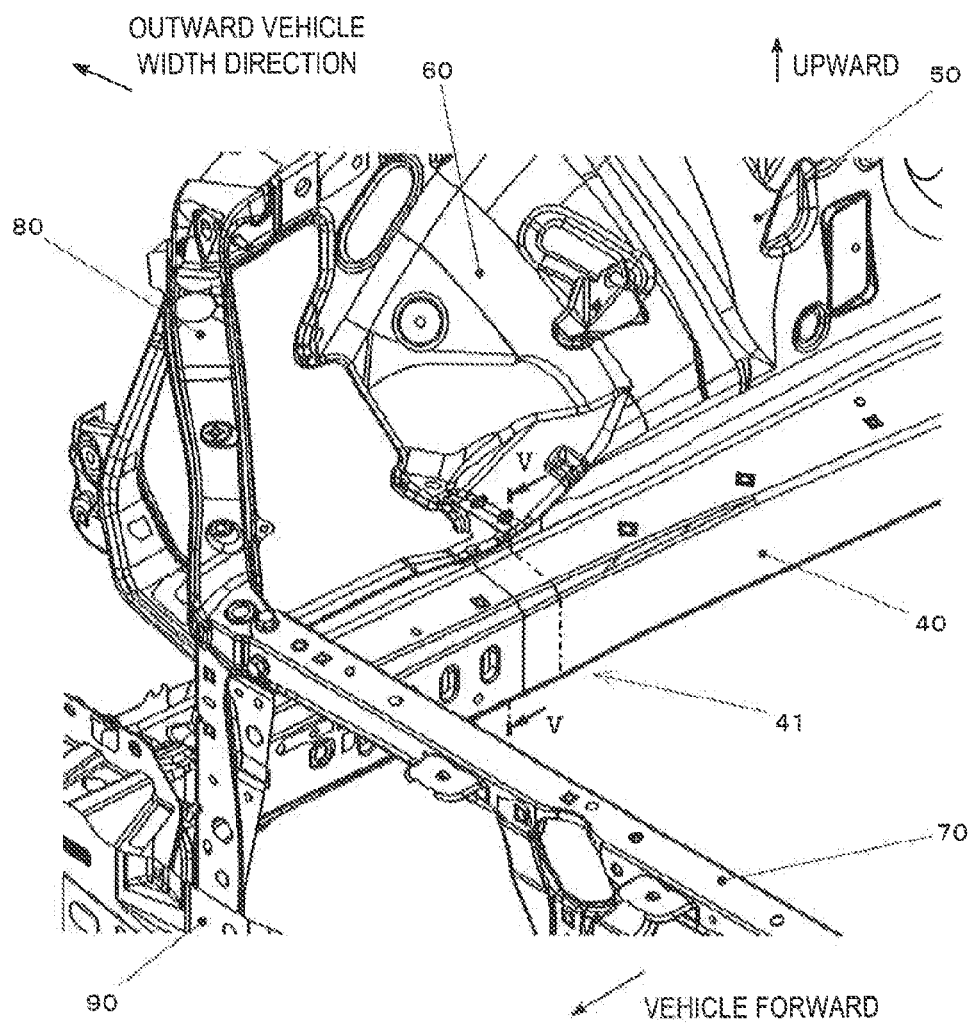
FIG. 2 is a perspective view illustrating a right-side front side frame in the vehicle front body structure of this example, viewed diagonally from front left.
Figure 3:
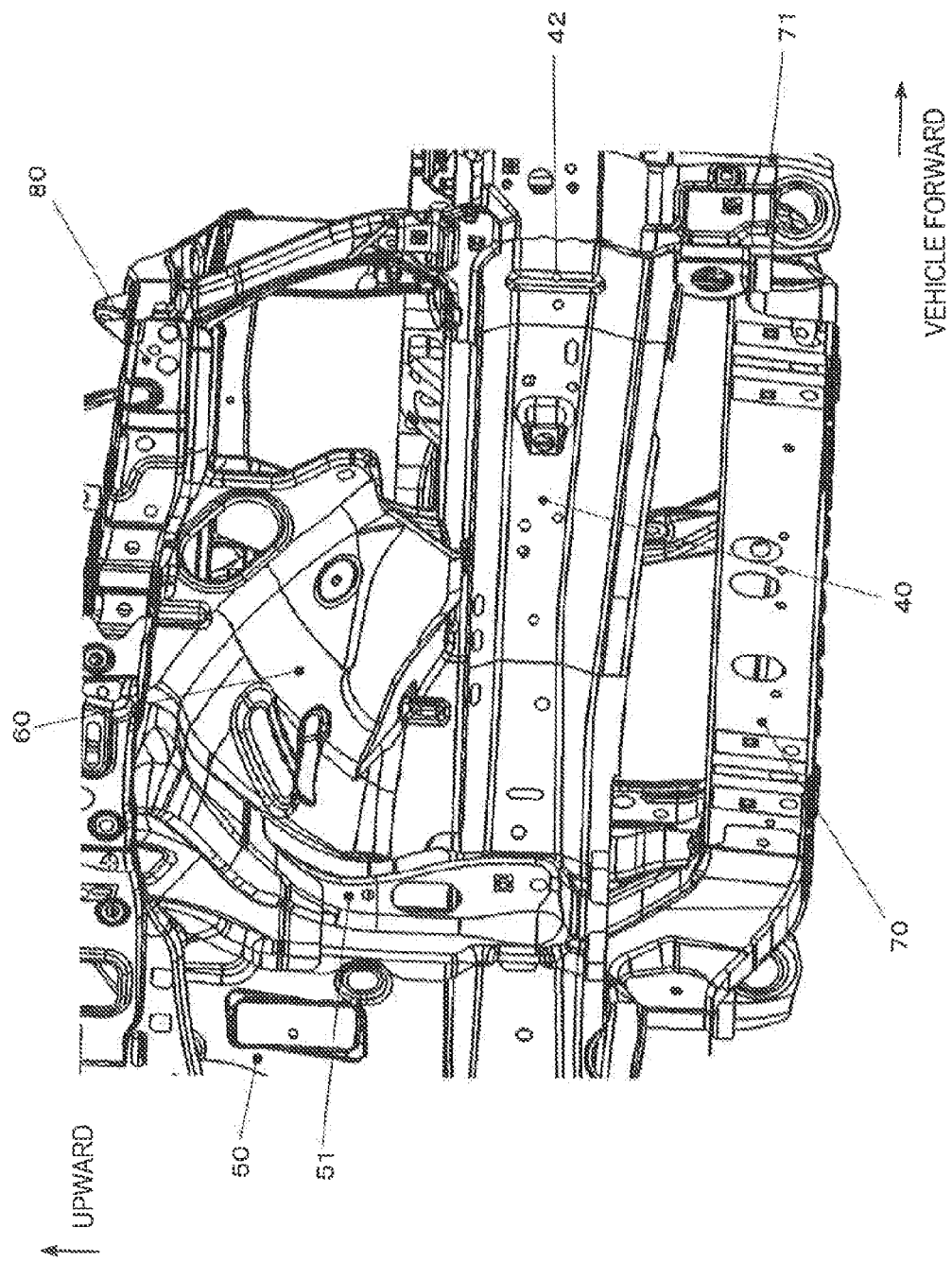
FIG. 3 is a perspective view illustrating the right-side front side frame in the vehicle front body structure of this example, viewed diagonally from rear right.
Figure 4:
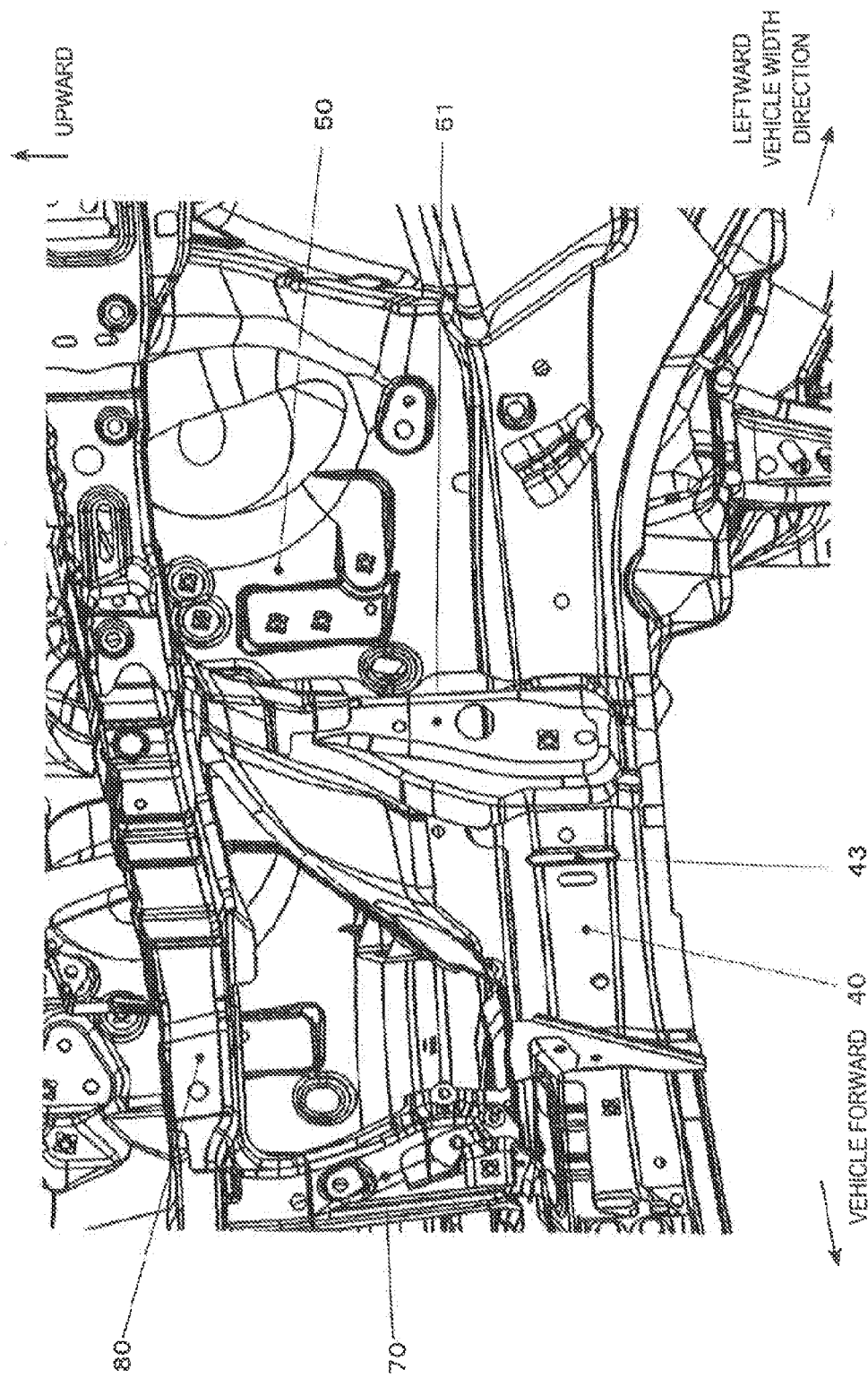
FIG. 4 is a perspective view illustrating a left-side front side frame in the vehicle front body structure of this example, viewed diagonally from front left.

Hereinafter, one example of the vehicle front body structure to which the present disclosure is applied is described. The vehicle front body structure of this example is to be mounted in a passenger car that carries a power unit, such as a gasoline engine, in an engine room formed in a front part of a cabin that accommodates a vehicle operator and passengers. FIG. 1 is an outline perspective view illustrating a white body (non-rigged body) of the vehicle front body structure of this example, viewed diagonally from front left. FIG. 2 is a perspective view illustrating a right-side front side frame in the vehicle front body structure of this example, viewed diagonally from front left. FIG. 3 is a perspective view illustrating the right-side front side frame in the vehicle front body structure of this example, viewed diagonally from rear right. FIG. 4 is a perspective view illustrating a left-side front side frame in the vehicle front body structure of this example, viewed diagonally from front left.

The vehicle front body structure is comprised of a floor panel 10, windshield posts (A-pillars) 20, a toe board 30, front side frames 40, strut housings 50, wheel aprons 60, a radiator panel 70, upper frames 80, and a bumper beam 90.

The floor panel 10 is a member that constitutes a floor surface part of the cabin where, for example, the vehicle operator and the passengers are accommodated. The floor panel 10 is formed, for example, by pressing a steel plate.

The windshield posts 20 are pillar-shaped member provided so as to stand upwardly from front end parts on both left and right of the floor panel 10. Each windshield post 20 is formed in the pillar shape having a closed cross-section by collecting a plurality of panels, each formed by pressing a steel plate, and assembling by spot welding, etc. Lower half parts of the windshield posts 20 are disposed along left and right side edge parts of the toe board 30, and serve as bases to which front doors (not illustrated) are swingably attached. Upper half parts of the windshield posts 20 are disposed so as to be rearwardly inclined, and are disposed along left and right side edge parts of a windshield glass (not illustrated).

The toe board 30 is a front bulkhead of the cabin and is provided between the left and right lower half parts of the windshield posts 20. The toe board 30 is formed so as to stand upwardly from a front end part of the floor panel 10. A bulkhead part 31 is formed in an upper end part of the toe board 30, which extends along a bottom edge part of the windshield glass and where wiper devices, etc. are disposed.

The front side frames 40 are structural members having beam shapes, which are formed so as to project forward in the vehicle from lower parts of the toe board 30. The front side frames 40 serve as bases to which front suspensions, subframes, cross members, and various exterior parts, etc. are attached. The pair of front side frames 40 is provided on the left and right so as to be separated from each other in vehicle width directions. Each front side frame 40 is constructed so as to have a substantially rectangular closed cross-section by collecting a pair of panels, for example, each formed by press-forming a steel plate, and butt-welding at flanges thereof. The cross-sectional shape of the front side frame 40 will be described in detail later. An engine room is formed between the left and right front side frames 40, where the power unit including an engine E (see FIG. 6) that is a power source of the vehicle is mounted.

Each strut housing 50 is a part that accommodates a strut of a Macpherson strut type front suspension. The strut housing 50 is formed in a bowl shape that opens downwardly, and a strut upper mount is provided in an upper end part thereof. The strut housing 50 is formed immediately in front of the toe board 30 so as to project from the corresponding front side frame 40 outwardly in the vehicle width directions and upwardly. As illustrated in FIG. 3, a reinforcement 51 is formed in a front end part of each strut housing 50. The reinforcement 51 forms a closed cross-section that extends along the front end part of the strut housing 50, from the corresponding upper frame 80 to a side face part of the front side frame 40.

Each wheel apron 60 is a part that constitutes part of a wheel house where a front wheel is accommodated. The wheel apron 60 is formed so as to project forward from the front end part of each strut housing 50. A lower end part of each wheel apron 60 is connected with an end part outward in the vehicle width directions in the upper end part of the front side frame 40. The upper end part of the wheel apron 60 is connected with the corresponding upper frame 80.

The radiator panel 70 is a part to which various cooling system parts, such as a radiator core that cools engine coolant, a capacitor of an air conditioner, and an electric fan, are attached. The radiator panel 70 is formed in a substantially rectangular frame when seen from front side of the vehicle, and is disposed between tip ends of the left and right front side frames 40. The upper end part and the lower end part of the radiator panel 70 are formed so as to project from the front side frames 40 upwardly and downwardly, respectively. As illustrated in FIG. 3, a tie-down hook 71 used, for example, for restraining the vehicle during transportation is formed in a side end part of the bottom end part of the radiator panel 70.

Each upper frame 80 is a structural member that is disposed so as to bridge from the corresponding upper end part outward in the vehicle width directions of the strut housing 50 to the upper end part of the radiator panel 70. The upper frame 80 extends forward in the vehicle from near the upper end part of the strut housing 50, and a part near the front end part is formed so as to be bent inwardly in the vehicle width directions. Each upper frame 80 serves as a base to which a front fender, a head lamp unit, etc. (unillustrated) are mounted.

The bumper beam 90 is a structural member having a beam shape, which is disposed forward of the radiator panel 70, and is disposed substantially in the vehicle width directions. The bumper beam 90 is constructed by fastening a bracket that is formed so as to project rearwardly to the front end parts of the left and right front side frames 40. The bumper beam 90 is a member that transmits a load inputted at the time of a vehicle collision, rearward through the vehicle.

Load transmitting members 91 are provided in areas of the bumper beams 90 outward in the vehicle width directions of the respective front side frames 40, and are formed so as to project rearwardly of the vehicle from respective rear surface parts of the bumper beams 90. Each load transmitting member 91 contacts the side face part of the adjacent front side frame 40 to transmit the load by pressing the front side frame 40, when the vehicle collides an obstacle diagonally from front, and the area of the corresponding bumper beam 90 outward in the vehicle width directions from the corresponding front side frame 40 is bent and deformed in a direction in which the projected end pat retreats. At this time, the load transmitting member 91 also demonstrates an effect of absorbing energy by collapsing while transmitting part of the load.

For example, if the vehicle normally travels on the right side of the road, the colliding risk with various obstacles, such as a guardrail, a support of a traffic sign or a traffic signal, a telegraph pole, a building, and a stopped vehicle, is higher on the right side of the vehicle rather than the left side. Therefore, the vehicle front body structure of this example is constructed in left-right asymmetry as described below to reduce damages to the power train at the time of colliding an obstacle diagonally from front right.

Figure 6:
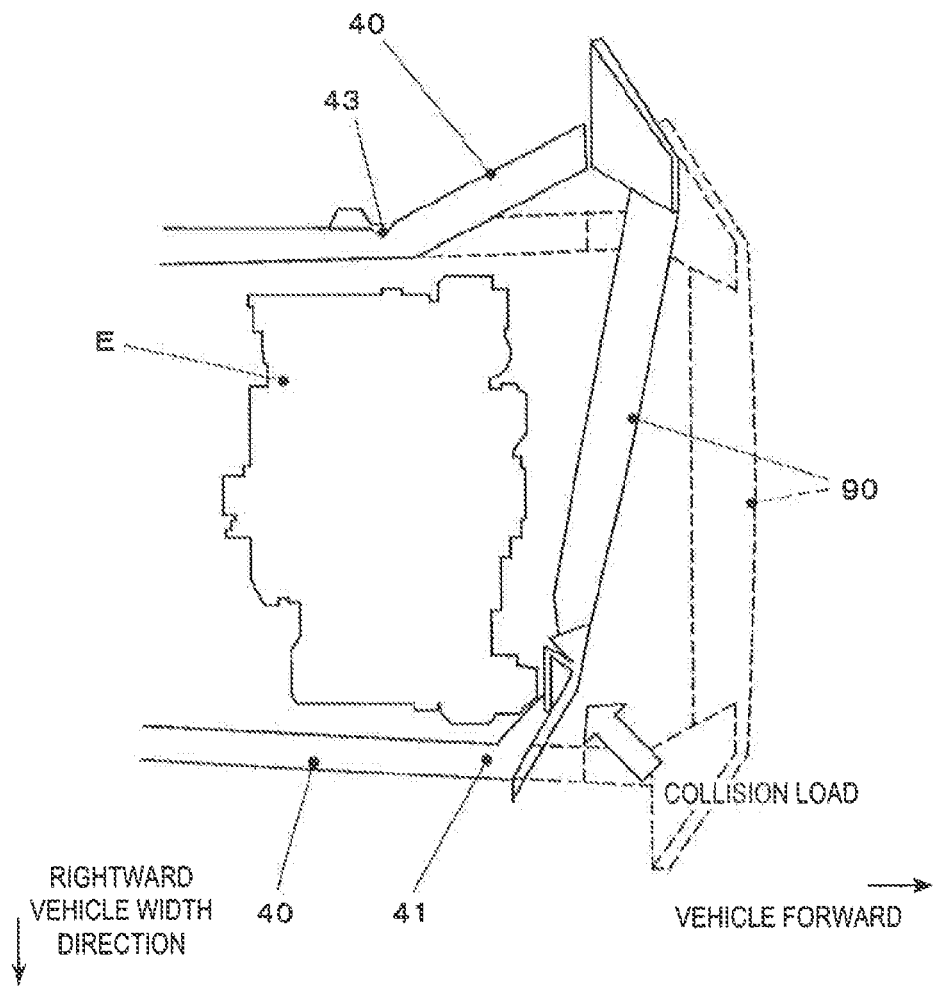
FIG. 6 is a schematic diagram illustrating a deformation of the vehicle front body structure of this example, when an obstacle collides diagonally from front right of the vehicle.

A reinforcement part 41, which is described below, is provided to the right-side front side frame 40. The reinforcement part 41 locally improves the strength against deformation of the area of the front side frame 40 forward of the reinforcement part 41 due to a compressive load in the front-and-rear directions and a bending load when pressing the tip end of the front side frame 40 from outside in the vehicle width directions. The reinforcement part 41 is an intermediate position of the front side frame 40, and is provided to an area forward of the strut housing 50. As illustrated in FIG. 6, the reinforcement part 41 is preferably disposed near the front end part of the engine E that is the power unit or further forward from this location.

Figure 5:
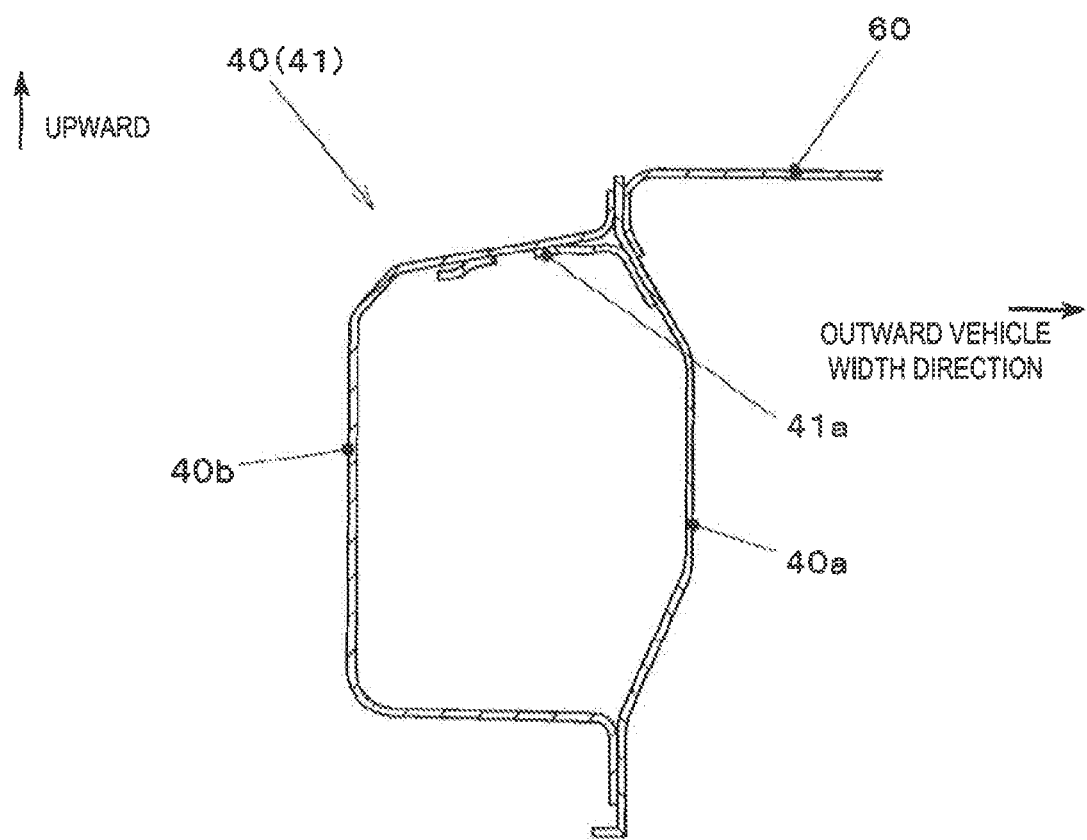
FIG. 5 is a cross-sectional view taken along a line V-V of FIG. 2.

FIG. 5 is a cross-sectional view taken along a line V-V of FIG. 2. For example, the basic cross-section of the front side frame 40 is constructed so as to have a substantially rectangular closed cross-section by spot-welding an outer panel 40a that constitutes the side face part outside in the vehicle width directions, and an inner panel 40b of a substantially channel cross-sectional shape that constitutes the side face part inside in the vehicle width directions, the upper face part, and the lower face part, at flange parts that are provided to the upper end part and the lower end part of the respective panels (i.e., but-welding at flanges).

Further, in the upper flange part, the flange part of the lower end part of the wheel apron 60 is also lap-welded with the flange parts of the outer panel 40a and the inner panel 40b. Further, in the reinforcement part 41, an upper edge of the upper flange part is continuously welded by arc welding to reduce opening of the flange parts at the time of a load input, and a patch 41a is added inside the closed cross-section. For example, the patch 41a is a panel formed by pressing a steel plate, is disposed in piles in a doubled manner, extending from the upper face part of the front side frame 40 to the upper part of the side face part outside in the vehicle width directions, and is joined by spot welding.

As illustrated in FIG. 3, a bead 42 that is a grooved recess extending in the vertical directions is formed in an area of the side face part outward in the vehicle width directions of the right-side front side frame 40, forward of the reinforcement part 41. The bead 42 is to induce an axial collapse forward of the reinforcement part 41, when a compressive load in the front-and-rear directions is inputted into the right-side front side frame 40 at the time of a front collision of the vehicle. Such an axial collapse is terminated at the area forward of the reinforcement part 41 if the compressive load is within a normally-expected input because the reinforcement part 41 demonstrates a function to stop the energy.

As illustrated in FIG. 4, another bead 43 is formed in the face part of the left-side front side frame 40 outward in the vehicle width directions. This bead 43 is a grooved recess that extends in the vertical directions. The bead 43 is disposed immediately forward of the reinforcement 51 of the strut housing 50, and rearward in the vehicle from the reinforcement part 41 of the right-side front side frame 40. The bead 43 is a fragile part used as a starting point to induce bending and deformation of the left-side front side frame 40, when a load outwardly in the vehicle width directions is inputted into a tip end of the left-side front side frame 40.

Hereinafter, effects of this example are described. FIG. 6 is a schematic diagram illustrating a deformation of the vehicle front body structure of this example when an obstacle collides diagonally from front right of the vehicle. In FIG. 6, dashed lines illustrate a state before the collision, and solid lines illustrate a state after the collision. First, a right end part of the bumper beam 90 is pushed by the obstacle, and is bent and deformed, and the load transmitting member 91 presses a side face part outward in the vehicle width directions near a tip end of the right-side front side frame 40. The bumper beam 90 retreats as a whole relatively to other parts of the vehicle body, and applies a compressive load in the front-and-rear directions to the front side frame 40.

With the configuration described above, although the front side frame 40 on the collision side (right side) is partially collapsed at the location forward of the reinforcement part 41, the part rearward of the reinforcement part 41 will not substantially be collapsed. Further, since the bending rigidity changes suddenly in the reinforcement part 41, the front side frame 40 is bent and deformed in an inward vehicle width direction corresponding to the displacement of the tip end, at a location immediately forward of the reinforcement part 41 as the starting point. At this time, the left-side front side frame 40 receives a bending load in a direction in which the tip end is pushed outwardly in the vehicle width directions (left side) because the bumper beam 90 is pushed leftward in the vehicle width directions. According to this bending load, the left-side front side frame 40 is bent and deformed in the direction in which the tip end is displaced outwardly in the vehicle width directions, at the bead 43 as the starting point.

According to the example described above, the following effects can be acquired.

(1) The reinforcement part 41 is formed in the right-side front side frame 40. Thus, when an obstacle collides the vehicle part on the right-side front side frame 40 side diagonally from front right, the axial collapse of the front side frame 40 is prevented. Accordingly, vehicle parts with high strength, such as the bumper beam 90 and the tie-down hook 71, are prevented from retreating toward the engine E and, thus, damages to the engine E are prevented. Further, the energy can be absorbed by allowing the front side frame 40 to be bent and deformed inwardly in the vehicle width directions, at the location forward of the reinforcement part 41. Here, the deformation of the front side frame 40 on the collision side is difficult to be disturbed and the deformation mode described above can stably be obtained by forming the bead 43 in the opposite-side front side frame 40 to stimulate the bending and deformation outward in the vehicle width directions.

(2) Since the bead 43 is disposed rearward in the vehicle from the reinforcement part 41, the deformation mode described above can be obtained more certainly.

(3) Since the load transmitting member 91 is provided to the bumper beam 90, the deformation mode described above can certainly be obtained by positively pressing the side face part of the front side frame 40 at the time of a collision. Further, the energy absorption can also be achieved by deformation and collapse of the load transmitting member 91.

Modifications

Various modifications and changes can be made to the present disclosure without limiting to the example described above, and those modifications and changes are also encompassed in the technical scope of the present disclosure.

(1) The shape, structure, material, manufacturing method, allocation, etc, of each member that constitutes the vehicle front body structure may suitably be changed, without limiting to the configurations of the example described above, (2) in the example described above, although the reinforcement part is formed by the addition of the arc welding and the patch in piles in a doubled manner, the reinforcement part may be formed by an addition of a reinforcement member of another shape or a change in the cross-sectional shape of the part to which the reinforcement part is formed. Further, the configuration of the fragile part is also not limited to the bead as illustrated in the example described above.

(3) In order to apply the example described above to the diagonal collision from the right side in the right-side traffic, the reinforcement part is formed in the right-side front side frame and the fragile part is formed in the left-side front side frame. However, for example, if the vehicle travels on the left side of the road where a diagonal collision from the left side becomes a problem, the reinforcement part may be formed in the left-side front side frame and the fragile part may be formed in the right-side front side frame.

(4) Although the power unit is a gasoline engine in the example described above, it may be an auxiliary machine, such as an electric motor or an inverter, or may be a hybrid system in which the engine and an electric system are combined, without limiting to the gasoline engine.

The invention claimed is:

1. A vehicle front body structure, comprising:
left and right front side frames that project forward in a vehicle from a front part of a vehicle cabin, and are disposed so as to be separated from each other in a vehicle width direction;
a coupling member that couples front end parts of the left and right front side frames; and
a power unit disposed in an area that is located between the left and right front side frames and rearward of the coupling member, wherein
a reinforcement part is formed in an intermediate position of either one of the left and right front side frames, the reinforcement part having an enhanced strength against a deformation due to a compressive load in a front-to-rear direction and a bending load caused when a tip end of the either one of the left and right front side frames is pressed from outside in the vehicle width direction, and
a fragile part is formed in an intermediate position of the other of the left and right front side frames, the fragile part having a reduced strength against a deformation due to a bending load when a tip end of the other of the left and right front side frames is pressed from inside in the vehicle width direction, and
wherein said other of the left and right front side frames is devoid of a symmetrically positioned reinforcement part as that provided on said either one of the left and right front side frames.

2. The vehicle front body structure of claim 1, wherein
the coupling member is a bumper beam provided so as to bridge between the tip ends of the left and right front side frames, and
a load transmitting member is provided in an area of the bumper beam outward in the vehicle width direction from the either one of the left and right front side frames so as to project rearward in the vehicle from the bumper beam, the load transmitting member being configured to press a side face part of the either one of the left and right front side frames when the vehicle collides with an obstacle diagonally from the front and the bumper beam is bent and deformed.

3. The vehicle front body structure of claim 1, wherein the fragile part comprises a vertically extending recess in said other of the left and right front side frames.

4. The vehicle front body structure of claim 1, wherein each of said left and right side frames is positioned for connection to a respective wheel apron of the vehicle.

5. The vehicle front body structure of claim 1, wherein said either one of said left and right side frames is comprised of an inner part and an outer part with respect to the vehicle width direction, with the inner and outer parts being joined along free edging to defined an inner space, and wherein said reinforcement part comprises a member that is positioned within the inner space and joined to each of said inner and outer parts.

6. The vehicle front body structure of claim 5, wherein the outer part is positioned on the vehicle front body structure for connection with a wheel apron of the vehicle.

7. The vehicle front body structure of claim 1, wherein the fragile part is disposed rearward in the vehicle from the reinforcement part.

8. The vehicle front body structure of claim 7, wherein
the coupling member is a bumper beam provided so as to bridge between the tip ends of the left and right front side frames, and
a load transmitting member is provided in an area of the bumper beam outward in the vehicle width direction from the either one of the left and right front side frames so as to project rearward in the vehicle from the bumper beam, the load transmitting member being configured to press a side face part of the either one of the left and right front side frames when the vehicle collides with an obstacle diagonally from the front and the bumper beam is bent and deformed.

9. The vehicle front body structure of claim 7 further comprising a second fragile part that is positioned on said either one of the left and right front side frames.

10. The vehicle front body structure of claim 9, wherein said second fragile part is positioned forward of said reinforcement part.

11. A vehicle front body structure, comprising:
left and right front side frames that project forward in a vehicle from a front part of a vehicle cabin, and are disposed so as to be separated from each other in a vehicle width direction;
a coupling member that couples front end parts of the left and right front side frames; and
a power unit disposed in an area that is located between the left and right front side frames and rearward of the coupling member, wherein
a reinforcement part is formed in an intermediate position of either one of the left and right front side frames, the reinforcement part having an enhanced strength against a deformation due to a compressive load in a front-to-rear direction and a bending load caused when a tip end of the either one of the left and right front side frames is pressed from outside in the vehicle width direction, and
a first fragile part is formed in an intermediate position of the other of the left and right front side frames, the first fragile part having a reduced strength against a deformation due to a bending load when a tip end of the other of the left and right front side frames is pressed from inside in the vehicle width direction, and
wherein said either one of said left and right side frames, which includes the reinforcement part, is devoid of a symmetrically positioned fragile part relative to the first fragile part provided on said other of said left and right side frames.

12. The vehicle front body structure as recited in claim 11, wherein said first fragile part is positioned rearward in the vehicle front-to-rear direction than said reinforcement part.

13. The vehicle front body structure as recited in claim 11, wherein said either one of said left and right front side frames includes a second fragile part that is positioned more forward in a vehicle front-to-rear direction than both said reinforcement part and said first fragile part.

14. The vehicle front body structure of claim 11, wherein each of said left and right side frames is positioned for connection to a respective wheel apron of the vehicle.

15. The vehicle front body structure as recited in claim 11, wherein said either one of said left and right front side frames includes a second fragile part that is non-symmetrically positioned relative to the first fragile part.

16. The vehicle front body structure as recited in claim 15, wherein the second fragile part is positioned closer to the coupling member than the first fragile part.

17. The vehicle front body structure of claim 11, wherein said either one of said left and right side frames is comprised of an inner part and an outer part with respect to the vehicle width direction, with the inner and outer parts being joined along free edging to defined an inner space, and wherein said reinforcement part comprises a member that is positioned within the inner space and joined to each of said inner and outer parts.

18. The vehicle front body structure of claim 17, wherein the outer part is positioned on the vehicle front body structure for connection with a wheel apron of the vehicle.

* * * * *